J. G. CONGREVE.
INCUBATOR.
APPLICATION FILED AUG. 23, 1911.
1,036,456.
Patented Aug. 20, 1912.
2 SHEETS—SHEET 1.
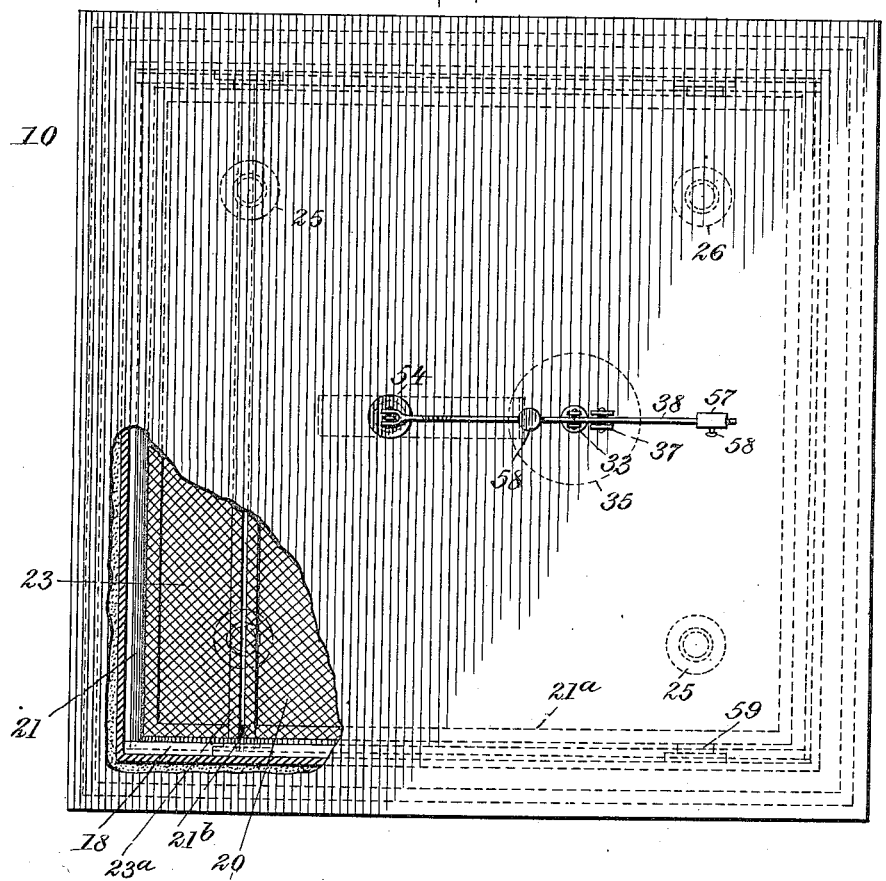
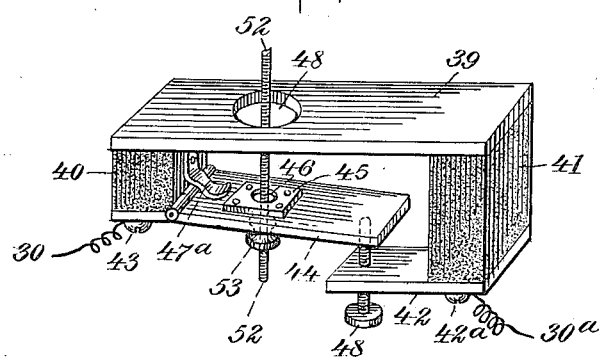
WITNESSES
INVENTOR
John G. Congreve
BY
Conrad A. Dutcher
his ATTORNEY

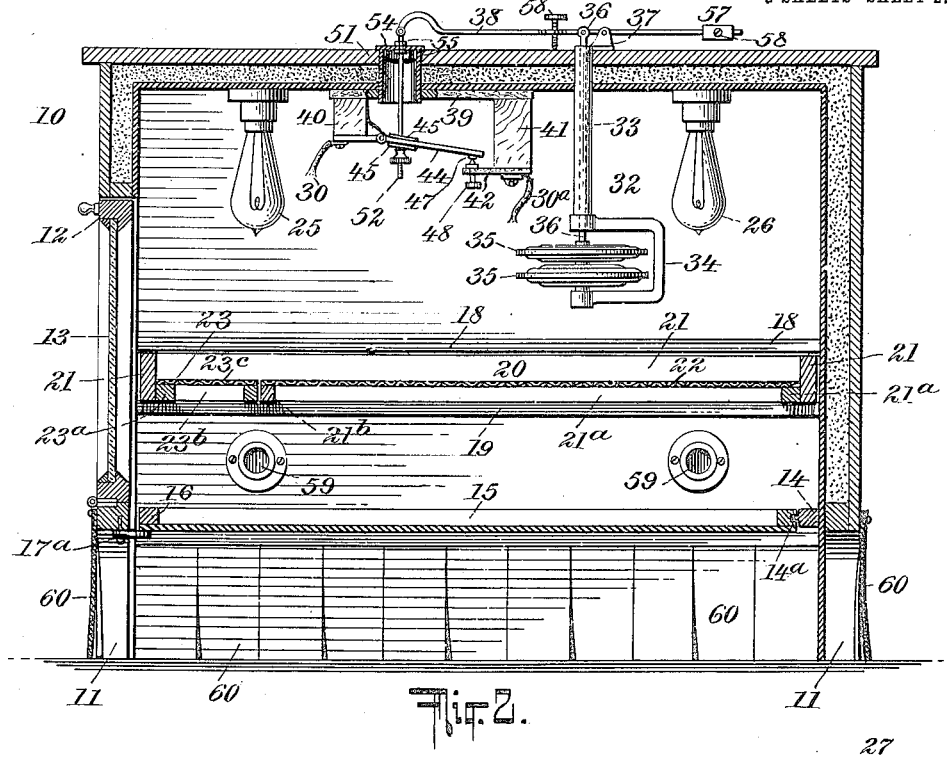

UNITED STATES PATENT OFFICE.

JOHN G. CONGREVE, OF NEW YORK, N. Y.

INCUBATOR.

1,036,456. Specification of Letters Patent. Patented Aug. 20, 1912.

Application filed August 23, 1911. Serial No. 645,597.

*To all whom it may concern:*

Be it known that I, JOHN G. CONGREVE, a citizen of the United States, residing at the city of New York, borough of Manhattan, in the county and State of New York, have invented certain new and useful Improvements in Incubators, of which the following is a full, clear, and exact specification.

My invention relates to improvements in combined incubators and brooders, and the same has for its object more particularly to provide a simple, efficient and reliable apparatus for artificially hatching and rearing poultry.

Further, said invention has for its object to provide an apparatus for the purposes specified which may be initially used as an incubator, and after the hatch is completed the apparatus may be continued in use without material change as a brooder.

Further, said invention has for its object to provide an incubator in which a minimum temperature may be constantly maintained and a predetermined temperature in excess of said minimum temperature automatically maintained and controlled.

To the attainment of the aforesaid objects and ends my invention consists of the novel details of construction and in the combination, connection and arrangement of parts hereinafter more fully described and then pointed out in the claims.

In the accompanying drawings forming part of this specification wherein like numerals of reference indicate like parts, Figure 1 is a plan or top view, partly broken out, showing one form of apparatus constructed according to and embodying my said invention; Fig. 2 is a horizontal section taken on the line 2—2 of Fig. 1; Fig. 3 is a detail perspective view showing the construction of the circuit closing device, and Fig. 4 is a diagrammatic view showing the arrangement of lights which serve as the heating agent; the circuit closing device, and method of connecting the same.

In said drawings the incubator is shown as comprising a double-walled casing 10 which is open at its bottom and supported in an elevated position on legs 11, 11. The space between the inner and outer walls of the casing is filled with asbestos, mineral wool, or other suitable insulating material. At the front of the casing 10 is provided a hinged door 12, having a glass panel 13 therein to permit of the examination of both the incubator and brooder sections of the apparatus. Upon the inner rear side of the casing 10, on about a line with the bottom of the door 12, is secured a supporting cleat 14 having a forwardly projecting ledge 14$^a$.

15 denotes a tray comprising a rectangular frame 16 having a bottom 17 of felt or other suitable material secured to the underside thereof. The rear edge of the frame 16 is provided with a recess 16$^a$ adapted to engage with the ledge 14$^a$ extending from the cleat 14 secured to the inner side of the casing. The forward edge of the tray is supported in position by means of turn buttons 17$^a$, 17$^a$ secured to the underside of the casing adjacent to its forward edge. Upon the opposite inner side of the casing 10, a short distance above the tray 15, are secured guide and supporting cleats 18, 19, respectively, between which the egg tray 20 is removably supported. The said egg tray 20 comprises a frame 21 along the inner sides of which adjacent to its lower edges are secured strips 21$^a$, 21$^a$, and adjacent to the forward edge of said tray is provided an additional transverse strip 21$^b$.

22 denotes a covering of wire netting or analogous material secured within the frame 21 upon the upper surfaces of the strips 21$^a$, 21$^b$. The said tray 20 is made smaller than the interior of the casing 10 in order to provide a space adjacent to the forward edge thereof.

23 denotes a smaller frame comprising longitudinal frame members 23$^a$ and a transverse member 23$^b$, and 24 denotes a covering of wire netting secured within the frame 23 upon said strips 23$^a$, 23$^a$ and 23$^b$. The frame 23 is adapted to be fitted into the forward portion of the casing intermediate the tray 20 and the front wall of the casing 10. The frame 23 with its attached covering 23$^c$ forms a trap door which may be removed after the hatch has been started to permit the young chickens to drop therethrough and into the brooder section of the apparatus. Upon the inner side of the top of the casing a number of incandescent electric lamps are arranged. The number of these lamps varies according to the size of the apparatus. In the present instance four lamps 25, 25, 26, 26, are employed, which are arranged in two series each comprising two lamps. The lamps 25, 25, are permanently connected in the circuit including conductors 27, 28, leading respectively to and from the source of electric energy, and by a conductor 29 connecting the remaining poles of said lamps. The lamps 26, 26, on the other hand, while permanently connected to the conductors 27, 28, are connected with each other by conductors 30, 30ª, which include an automatic circuit closer 31. The circuit closer 31 serves to interrupt the circuit and automatically extinguish the lamps 26, 26 when the temperature rises above the predetermined degree.

32 denotes a thermostat comprising a tubular support 33 having its upper end secured within and extending through the top of the casing 10. To the lower end of said tubular support 33 is secured a yoke 34 within which are arranged a plurality of superposed receptacles 35, 35, which are connected together and the lower one of said receptacles is secured to the lower end or member of the yoke 34 while the upper receptacle is connected to a rod 36 extending to the tubular support 33, and to the other of said receptacles 35. The receptacles 35, 35, may be filled with mercury, ether or other volatile fluid. Upon the top of the casing adjacent to the upper end of the tubular support 33 is secured a bearing 37 in which is pivotally mounted a beam 38 to which is pivotally secured, adjacent to the bearing 37, the upper end of the rod 36. The circuit closer 31 is secured upon the underside of the top of the casing and comprises the base 39 having secured to the opposite ends thereof depending blocks 40, 41 made of fiber or other suitable insulating material. To the underside of the block 41 is secured a metal contact plate 42 which is maintained in position by screws 42ª to which is also connected one end of the conductor 30ª. To the underside of the block 40 is secured by screws 43 a hinged member 44. The free portion of said hinged member 44, adjacent to its point of support, is provided with an opening, and above and below said opening are secured plates of insulating material 45 having openings 46 therein, and adjacent to the free end of said hinged member is secured a contact point 47 which is adapted to engage with an adjustable contact screw 48 extending through the plate 42. A spring 47ª is secured to the insulating block 40 and has its free end bearing upon the hinged member 44 in order to maintain the forward end thereof in contact with the screw 48 on the plate 42. The contact point 47 is connected to one end of the conductor 30 leading from one of the lamps 26. The base 39 is provided with an aperture 48 which registers with the apertures 46 in plates 45 on the hinged contact member 44.

51 denotes a tubular bushing also preferably made of insulating material, which extends through the top of the casing and the opening 48 in the base 39. The said tubular bushing serves as an air vent for the escape of the heated air when the temperature within the casing 10 rises above the predetermined degree.

52 denotes a screw-threaded rod which is secured at its upper end to one end of the beam 38 and has its other end extending through the bushing 51, and the opening 46 in the hinged member 44, and 53 denotes an adjusting nut arranged upon the lower end of the rod 52. Adjacent to the upper end of the rod 52 is disposed a cap 54 adapted to seal the upper end of the bushing 51 in order to control the escape of the heated air from the interior of the casing. The said cap 54 is maintained in its adjusted position upon the rod 52 by adjusting nuts 55, 55, arranged above and below said cap. Upon the opposite end of the beam 38 is arranged an adjustable counterweight 57 and intermediate the rod 52 and the bearing 37 said beam 38 is provided with an adjusting screw 58 by means of which jointly with the adjusting nut 53, on the rod 52, the circuit closer 31 may be exactly adjusted so as to break the circuit and open the cap 54 when the temperature within the casing attains the predetermined degree.

When the apparatus is to be used merely as a brooder, the egg tray sections 21, 23, are first removed from their supports, and then the tray 15 disposed upon the supporting cleats 19, 19, previously occupied by said egg tray sections. Upon the inner sides of the casing below said supporting cleats 19, 19, are provided a plurality of lamp sockets 59, 59, which are permanently connected with the source of electric energy. These sockets are adapted to receive lamps after the hatch is completed in order to maintain the interior of the casing above the lower tray 15 at a proper uniform temperature. The lower portion of the casing 10 intermediate the legs 11 is provided with a series of overlapping vertical flaps made of felt or analogous material to permit the young chickens to pass in and out of the lower portion of the apparatus.

The operation of the apparatus is as follows: The eggs are placed upon the trays and assuming that the circuit closer 30 has been adjusted to maintain a predetermined temperature the current is then turned on and the lamps 25, 26, caused to glow. Should the temperature within the casing rise above the predetermined degree, the expansion of the fluid within the thermostat casings 35, 35, will cause the beam 38 to be slightly raised, and this in turn will break the secondary circuit and extinguish two of the lamps, namely 26, 26, and at the same time the cap 54 will be raised from the top of the bushing 51 and permit the hot air from the interior of the casing to escape through said bushing. This action will then continue until the temperature within the casing again falls and causes the thermostat to resume its initial position, cap 54 to seal the air outlet again, and the circuit closer 31 to complete the circuit again and cause all the lamps to glow.

Having thus described my invention, what I claim and desire to secure by Letters Patent is:

1. A combined incubator and brooder comprising a casing having an air outlet therein, means for maintaining said air outlet normally sealed, egg supporting means arranged in said casing, electric heating means comprising two parts arranged in said casing, a circuit-closing device in circuit with one of said parts; said circuit-closing device comprising a fixed member and a movable member connected to the means for sealing said air outlet, a thermostatic controlling device, means connecting said thermostatic controlling device with the means for sealing said outlet whereby to simultaneously open the sealing means for said air outlet and to operate the movable member of said circuit-closing device to break the circuit including said part of the electric heating means above-named, substantially as specified.

2. A combined incubator and brooder comprising a casing having an air outlet therein, a cover for maintaining said air outlet normally sealed, an egg supporting tray arranged in said casing, a plurality of electric heating devices arranged in said casing above said egg supporting tray, a circuit-closing device in circuit with certain of said electric heating devices; said circuit-closing device comprising a fixed member and a movable member connected to the cover for sealing said air outlet, a thermostatic controller, a beam pivotally mounted upon said casing, a rod connecting one end of said beam with said thermostatic controller, a rod connecting the other end of said beam with the movable member of said circuit-closing device and the cover for said air outlet whereby to simultaneously open the cover of said air outlet and to operate the movable member of said circuit-closing device to break the circuit including the certain of the electric heating devices above-named, substantially as specified.

3. A combined incubator and brooder comprising a casing having an air outlet therein, a cover for maintaining said air outlet normally sealed, an egg supporting tray arranged in said casing, a plurality of heating devices arranged in said casing above said egg supporting tray, a circuit-closing device in circuit with certain of said electric heating devices; said circuit-closing device comprising a fixed member and a movable member adjustably connected to the cover for sealing said air outlet, a thermostatic controller, a beam pivotally mounted upon said casing, a rod connecting one end of said beam with said thermostatic controller, a rod connecting the other end of said beam with the movable portion of said circuit-closer and the cover for said air outlet whereby to simultaneously open the cover of said air outlet, and to operate the movable member of said circuit-closing device to break the circuit including the certain of the electric heating devices above-mentioned, substantially as specified.

4. A combined incubator and brooder comprising a casing, an air outlet therein, an egg supporting tray arranged in said casing, a plurality of electric heating devices arranged in said casing, a circuit-closing device arranged in said casing and in circuit with said electric heating devices; said circuit-closing device comprising a fixed contact member and a pivotally-mounted, spring-pressed contact member, a thermostatic controller, a beam pivotally mounted upon said casing, means for regulating the movement of said beam, a rod connecting one end of said beam with said thermostatic controller, a rod pivotally connected to the other end of said beam, means for adjustably connecting said rod with the pivotally mounted contact member of said circuit-closing device, and a cover for said air outlet adjustably mounted upon said last-named rod, substantially as specified.

Signed at the city of New York, in the county and State of New York, this 18th day of August, nineteen hundred and eleven.

JOHN G. CONGREVE.

Witnesses:
CONRAD A. DIETERICH,
JOSEPH G. QUINN, Jr.